United States Patent
Lemense et al.

[11] Patent Number: 5,958,081
[45] Date of Patent: Sep. 28, 1999

[54] ENERGY EFFICIENT REMOTE CONTROL PROTOCOL WITH IMPROVED RELIABILITY

[75] Inventors: Thomas J. Lemense, Livonia; Tejas B. Desai, Westland, both of Mich.

[73] Assignee: Ford Motor Company, Dearborn, Mich.

[21] Appl. No.: 08/541,092

[22] Filed: Oct. 11, 1995

[51] Int. Cl.[6] ............................. G06F 11/00; H03M 13/00
[52] U.S. Cl. ........................ 714/811; 714/814; 714/799; 714/752; 714/758
[58] Field of Search ........................... 371/57.1, 53, 37.7, 371/49.1, 20.1, 48, 37.01, 61; 395/142, 185.05, 550; 370/13; 359/142, 145; 714/811, 752, 758, 814, 799

[56] References Cited

U.S. PATENT DOCUMENTS

| | | | |
|---|---|---|---|
| 4,186,345 | 1/1980 | Marita et al. | 325/27 |
| 4,251,812 | 2/1981 | Okada et al. | 340/696 |
| 4,377,862 | 3/1983 | Koford et al. | 371/32 |
| 4,459,591 | 7/1984 | Haubner et al. | 340/825.57 |
| 4,555,702 | 11/1985 | Matsuura et al. | 340/825.64 |
| 4,612,640 | 9/1986 | Mehrotra | 371/51 |
| 4,870,425 | 9/1989 | Gunny | 342/455 |
| 4,931,790 | 6/1990 | Kobayashi et al. | 340/825.64 |
| 5,349,459 | 9/1994 | Reed | 359/142 |
| 5,363,418 | 11/1994 | Nakano et al. | 375/117 |
| 5,513,347 | 4/1996 | Wakatsuki et al. | 395/185.05 |

FOREIGN PATENT DOCUMENTS

| | | |
|---|---|---|
| 0102815 | 3/1984 | European Pat. Off. . |
| 0458097-A2 | 11/1991 | European Pat. Off. . |
| 0480246-A1 | 4/1992 | European Pat. Off. . |

*Primary Examiner*—Phung M. Chung
*Attorney, Agent, or Firm*—Mark Mollon

[57] ABSTRACT

An energy efficient remote control protocol uses a start bit which has a variable length which corresponds to the parity of the transmitted symbol, a guard time which is fixed at a predetermined length, and a data transmission time which corresponds to the data to be transmitted. The data to be transmitted is transmitted as a logic low, thus improving the energy efficiency of the system. During the transmission of a code, only one stop bit is used at the end of the transmission. The guard time and parity check are used to verify proper transmission.

16 Claims, 3 Drawing Sheets

| | | | | | | | |
|---|---|---|---|---|---|---|---|
| A. Hex Data | 1 | F | 2 | 4 | D | E | 2 | C | 7 | 6 | 1 | B |
| B. Binary Data = | 0001 | 1111 | 0010 | 0100 | 1101 | 1110 | 0010 | 1100 | 0111 | 0110 | 0001 | 1011 |
| C. Regrouped = | 000111 | 110010 | 010011 | 011110 | 001011 | 000111 | 011000 | 011011 |
| D. Symbol # | 7 | 50 | 19 | 30 | 11 | 7 | 24 | 27 |
| E. Parity | 1 | 1 | 1 | 0 | 1 | 1 | 0 | 0 |
| F. Start Pulse Width | 0.7 ms | 0.7 ms | 0.7 ms | 0.5 ms | 0.7 ms | 0.7 ms | 0.5 ms | 0.5 ms |
| G. Guard Time | 0.5 ms | 0.5 ms | 0.5 ms | 0.5 ms | 0.5 ms | 0.5 ms | 0.5 ms | 0.5 ms |
| H. Data Dead Time | 0.7 ms | 5.0 ms | 1.9 ms | 3.0 ms | 1.1 ms | 0.7 ms | 2.4 ms | 2.7 ms |
| I. Total Dead Time | 1.2 ms | 5.5 ms | 2.4 ms | 3.5 ms | 1.6 ms | 1.2 ms | 2.9 ms | 3.2 ms |

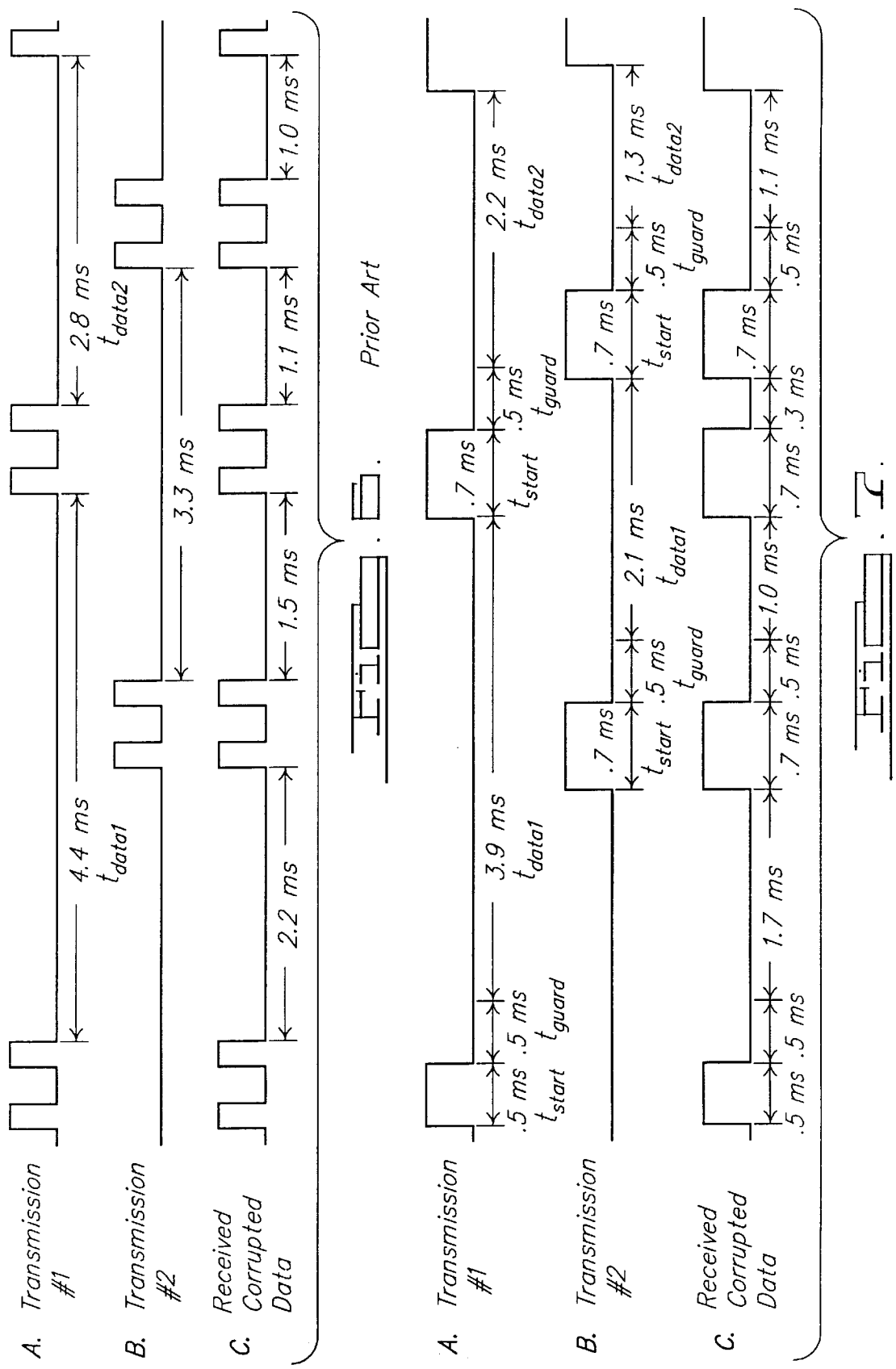

ENERGY EFFICIENT REMOTE CONTROL PROTOCOL WITH IMPROVED RELIABILITY

BACKGROUND OF THE INVENTION

The invention relates generally to a transmission protocol for remote control systems, and more particularly, to a transmission protocol for vehicle applications that is energy efficient and has high reliability.

The use of remote control transmitters for activating anti-theft systems and remote entry systems in automotive vehicles is increasing. The remote control transmitters are generally battery operated and emit a coded signal for enabling and disabling particular functions. The transmission must be energy efficient since it is desirable to extend the battery life of the transmitter.

Another desirable attribute in remote control systems is reliable system performance. With increasing implementation of remote control systems, it is increasingly desirable to have the remote control system distinguish between transmissions for its associated transmitter and transmissions from other transmitters. Such a problem occurs when two similar systems transmit simultaneously. When two or more systems transmit simultaneously, the receiver may interpret the transmission as an actual transmission rather than recognizing it as an erroneous transmission.

One transmission protocol for remote generating systems is described in U.S. Pat. No. 5,349,459. The system generates a string of start and stop pairs. The time between each stop and start pulse pair is proportional to a corresponding value in a key code sequence. The system is susceptible to both random and periodic noise. That is, a noise spike or other noise may be determined as valid data. Such a system is also susceptible to jamming by other similarly encoded transmission sources. This system may also interpret two or more simultaneous transmissions as a third data packet and unknowingly try to interpret it as a valid transmission. Another drawback to the system is that each transmitted symbol uses a pair of start and stop bits which is inefficient energy management.

It would therefore be more desirable to provide a remote control protocol capable of determining when a corrupt signal is received while consuming minimal amount of energy for each transmission.

SUMMARY OF THE INVENTION

One advantage of the invention is that the energy assumed and transmitting at a data packet is significantly reduced due to the use of only one socket per data packet rather than per bit.

The present invention includes a transmitter generating a transmission of a code. The code has a plurality of bits. The transmitter groups the bits into a plurality of groups, each of the groups having a parity and a numeric value. The transmission has a plurality of segments corresponding to each of the groups. Each of the segments has a start bit length corresponding to the parity of the group and a data length corresponding to the numeric value of the group. A receiver is connected to a memory and receives the transmission and converts the transmission into a received code based on the data length of each of the segments. The receiver compares the code to a stored code in the memory and enables a function if said received code matches said stored code.

BRIEF DESCRIPTION OF THE DRAWINGS

FIGS. 4A–4I is a 48-bit data code according to the present invention.

FIGS. 6A and 6B are two transmissions according to a prior art protocol.

FIG. 6C is a combination of the transmissions of FIGS. 6A and 6B.

FIGS. 7A and 7B are transmissions using the protocol of the present invention.

FIG. 7C is a combination of the transmissions of FIG. 7A and 7B.

DETAILED DESCRIPTION OF THE PREFERRED EMBODIMENT

Figure 1:
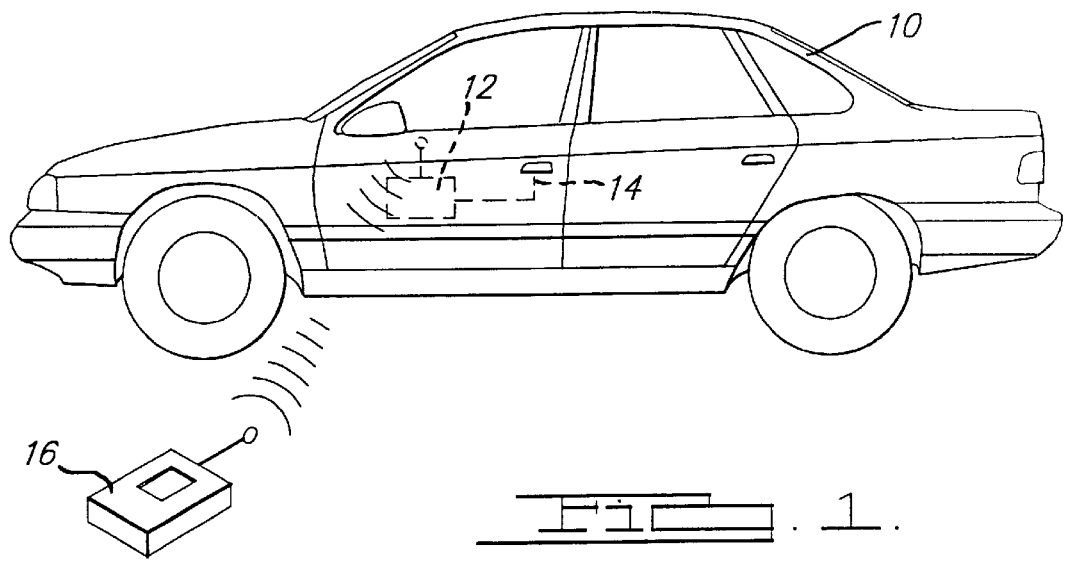
FIG. 1 is a diagrammatic view of an automobile having a remote control system according to the present invention.

Referring to FIG. 1, an automobile 10 has a remote control system that enables or disables a function upon receipt of a valid security code. Remote control systems with a receiver 12 are used to disarm an automobile anti-theft system to unlock a door latch 14 upon receipt of a valid code. A transmitter 16 is used to transmit the coded signal to receiver 12. The coded signal of the present invention is preferably an RF signal. However, various transmission methods may be used, such as infrared or transmission through wire. The coded signal has a start bit and a data code portion. To conserve energy, the data code portion preferably is a low logic level signal, i.e., dead time where the duration of the dead time represents the data.

Figure 2:
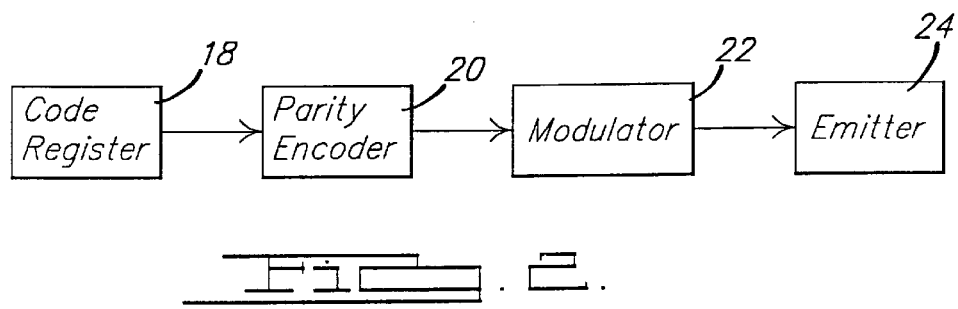
FIG. 2 is a block diagram of the transmitter according to the present invention.

Referring now to FIG. 2, transmitter 16 has a code register 18, a parity encoder 20, a modulator 22, and an emitter 24. Code register 18 is used to store the code information which is typically in hexadecimal form. Code register 18 converts the hexadecimal digits to binary, i.e., four binary bits. Code register 18 groups the bits for binary transmission, e.g., a group of six bits is used in this example.

Parity encoder 20 is used to determine the parity of the groups of bits from code register 18. Parity is the number of ones in a binary data packet. The parity information is used to determine the length of the start bit. A different time duration is assigned to an odd or even parity. For example, if the code in the code register is even, then the length of the start bit is 0.5 milliseconds and if the code in the code register is odd then the length of the start bit is 0.7 milliseconds.

Modulator 22 converts the information from code register 18 and parity encoder 20 into segments to be transmitted. The segments have a start bit, guard time and data information for each group of bits. The start bit is preferably a high logic level. The data information and guard time are a low logic level whose data length represents the actual data information. The guard time is further described below and is used as a check on the transmitted signal. The information from code register 18 and parity encoder 20 is then modulated into a modulated signal.

Emitter 24 receives the modulated data from modulator 22 and transmits the information. In the present example an RF transmission is used.

Figure 3:
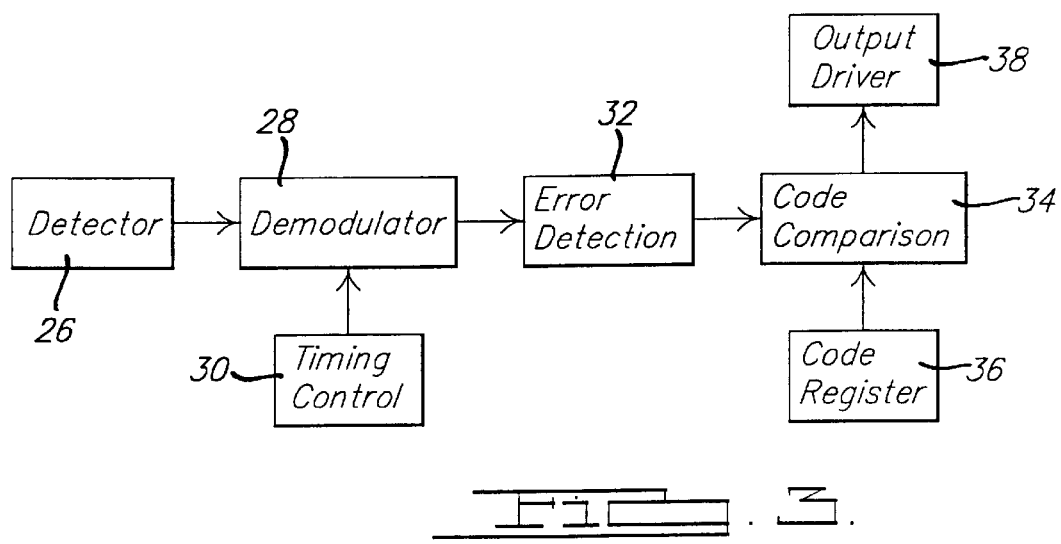
FIG. 3 is a block diagram of a receiver according to the present invention.

Referring now to FIG. 3, receiver 12 has a detector 26, a demodulator 28, timing control 30, an error detector 32, a code comparator 34, a code register 36, and an output driver 38. Detector 26 is used to detect the transmitted code segments from the transmitter 16.

Demodulator 28 receives the pulses from detector 26 and separates the transmission into segments. Timing control 30 measures the time of the start pulses and dead time between the pulses received by demodulator 28. Error detector 32 determines whether there has been an error in the transmission of the signal or the reception of the signal. The operation of error detection 32 will become evident in conjunction with FIGS. 4 and 7. Error detector provides an indication of an error by generating an error signal to provide feedback to a system controller or to an indicator such as an audible warning or visual warning like an indicator light.

Code comparator 34 compares a code stored in code register 36 with a received code. If the code in code register 36 and the received code are the same, then output driver 38 enables, for example, an unlock feature for the vehicle. Code 36 is a memory device.

Figures 4, 5:
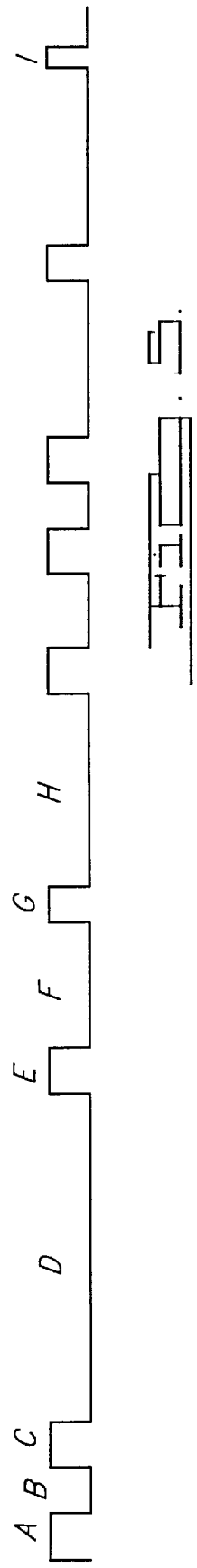
FIG. 5 is a transmission of a 48-bit data code of FIG. 4.

Referring now to FIG. 4, FIG. 4A is an example of a hexadecimal data code for a 48 bit data code to be transmitted.

In FIG. 4B, the hex data code of FIG. 4A is converted in code register 18 into a binary data packet. The binary data is shown directly below that of FIG. 4A.

In FIG. 4C, before the data is transmitted, the 4-bit data is regrouped in code register 18 into 6-bit groupings, which are shown directly below that of their corresponding bits of FIG. 4B.

In FIG. 4D, the decimal equivalent of the 6-bit regrouping is shown. FIG. 4E, the parity of the 6-bit group is shown for each of the 6-bit symbols directly below their associated symbols. In FIG. 4F, the duration of start pulse of each data packet is shown. The start pulse length corresponds to the parity of the 6-bit regrouping. The start pulse for odd parity is 0.7 milliseconds, and the start pulse for an even parity is 0.5 milliseconds.

In FIG. 4G, the duration of the guard time is shown for each associated data packet. The guard time is preferably constant for each grouping. In this case the guard time is a constant 0.5 milliseconds.

In FIG. 4H, the duration of data dead time for each 6 bit regrouped packet is shown below its associated 6-bit regroup packet. The dead time associated with each symbol is the decimal equivalent of the grouping multiplied by 0.1 milliseconds. The multiplier may be any convenient value. For the first group, the decimal equivalent of the symbol is 7, which corresponds to 0.7 milliseconds. The decimal equivalent of the second symbol is 50, which corresponds to 5 milliseconds. For the third regrouped packet, the decimal equivalent is 19, which corresponds to 1.9 milliseconds, and so forth. Also, the guard time is part of the dead time, which is a constant 0.5 milliseconds.

In FIG. 4I, the total dead time associated with each data packet is shown. For example, the first data group, has 0.5 milliseconds dead time associated with the guard time and 0.7 milliseconds of dead time associated with the data group for a total dead time of 1.2 milliseconds. For the second symbol, the dead time associated with the symbol is 5 milliseconds plus a guard time of 0.5 milliseconds for a total dead time of 5.5 milliseconds, and so on.

Referring now to FIG. 5, the transmission of the 48-bit data packet is shown. Portion A is a start bit of 0.7 milliseconds in duration since the parity of the first symbol is odd. In portion B, the dead time associated with the symbol is 0.7 milliseconds plus the guard time of 0.5 milliseconds, a total dead time of portion B of 1.2 milliseconds. In portion C, the parity is odd so the start pulse width is 0.7 milliseconds. In portion D, the total dead time is 5.5 milliseconds. The guard time is 0.5 milliseconds, and the data time is 5 milliseconds. In portion E, the parity of the symbol is again odd so the start bit is 0.7 milliseconds. In portion F, the dead time is a total of 2.4 milliseconds, 1.9 milliseconds of which corresponds to the data. In portion G, the parity is even, thus the start bit is thus 0.5 milliseconds. In portion H, the total dead time is 3.5 milliseconds, which corresponds to a data time of 3 milliseconds. At the end of the 48-bit code, portion I is a stop bit, which is used only at the very end of the 48-bit data packet, and may be assigned a unique width to clearly indicate the end of the packet transmission.

Referring now to FIGS. 6A and 6B, two transmissions are shown using the data and coding scheme of U.S. Pat. No. 5,349,459, as described in the Background Of The Invention. In FIG. 6C, the data of two simultaneous transmissions is added together and received as one signal. The signal of FIG. 6C, if decoded according to the '459 patent would be interpreted as a valid coded signal. Thus, a wrong code would be received by the transmitter and the lock or other associated function would not be enabled. No indication of a corrupt signal would be given by the receiver. Further, two wrong codes may combine to form a proper code to enable the system.

Referring now to FIGS. 7A and 7B, two transmissions using the present invention are shown. Each of the transmissions has a start time, a guard time, and data time. In FIG. 7C, the two transmissions would be simultaneously received. However, according to the present invention, these transmissions would be determined to be corrupt data. The corrupt data would therefore not be able to enable or disable a function. The decoding circuitry would, however, be able to interpret this as corrupt data. As the transmission of FIG. 7C is received by receiver, starting with portion H which is 0.7 milliseconds long, this indicates that the parity of the data should be odd parity. Portion I is the guard time which is always 0.5 milliseconds. Portion J is 1.0 milliseconds, which corresponds to a coded symbol of 10 which the 6-bit grouping of which in binary is 001010. For this grouping, counting the number of 1's the parity is even. Since the receiver is expected to receive an odd parity, the received code fails the parity check. Thus, the transmission will be rejected. Looking at signal portions K–M, portion K is 0.7 milliseconds, which corresponds to an odd parity, but portion L is smaller than 0.5 milliseconds, so the guard time of 0.5 milliseconds has been violated, which also signals that the transmission received is corrupt.

By using the dead time duration between two different start bit pulse widths to represent multiple bits of data and even and odd parity, then energy required in the operation of the system is minimized. Random and periodic noise pulses, which will be interpreted as symbol start pulses will fail the symbol parity check since the start bit width or the guard time or both is not proper. The ability to reject two or more simultaneous electromagnetic energy transmissions is critical since the nature of the remote control transmissions are asynchronous and all electromagnetic energy receivers share the same channel, which will superimpose received energy It would be evident to those skilled that various modifications are intended to be within the scope of the invention. For example, the length of the start pulses and the times associated with the data pulses may be varied.

What is claimed is:

1. A remote control system comprising:

a transmitter for generating a transmission of a code, said code having a plurality of bits, said transmitter grouping said bits into a plurality of groups, each of said groups having a parity and a numeric value, said transmission having a plurality of segments corresponding to each of said groups, each of said segments having a start bit corresponding to said parity of said group and a data length corresponding to said numeric value of said group, said data length being determined by a length of time between successive start bits;

a memory;

a receiver connected to said memory for receiving said transmission and converting said transmission into a received code based on said data length of each of said segments and comparing said code to a stored code in said memory and enabling a function if said received code matches said stored code.

2. A remote control system as recited in claim 1 wherein said receiver separates said transmission into segments, each segment having a start bit and said data length, said receiver converting said data length into a numeric value having a parity, said start bit having a corresponding parity associated therewith, said receiver comparing said parity corresponding to said start bit to said parity of said numeric value, and if said parity of said numeric value is not equal to the parity indicated by said start bit, providing an indication of corrupt data.

3. A remote control system as recited in claim 1 wherein each of said segments has a guard time included in said length of time between successive start bits, said receiver comparing said guard time and said length of time between successive start bits, and if said length of time between successive start bits is less than said guard time, providing an indication of corrupt data.

4. A remote control system as recited in claim 1 wherein each of said segments has a first logic level start bit corresponding to said parity of said group and a second logic level data length corresponding to said numeric value of said group.

5. A remote control system as recited in claim 1 wherein said first logic level is a high logic level.

6. A remote control system as recited in claim 1 wherein said second logic level is a low logic level.

7. A remote control system as recited in claim 1 wherein said transmitter generates a single stop bit after said transmission.

8. A remote control system comprising:

a transmitter having:
 a code register for storing a code having a plurality of bits, said code register grouping said plurality of bits into a plurality of groups each having a respective numeric value;
 a parity encoder connected to said code register for determining the parity of each group;
 a modulator connected to said parity encoder for converting said groups into a plurality of segments each segment having a start bit and a data length, said start bit corresponding to said parity of said group and said data length of said group having a length corresponding to said numeric value; and
 an emitter connected to said modulator for generating a transmission encoding first and second logic levels defining said data length as a time period between successive start bits for successive segments; and a receiver having:
 a detector for receiving said transmission;
 a demodulator connected to said detector for separating said transmission into segments, each of said segments having a start bit and a data length;
 a timing controller connected to said demodulator for measuring time between successive start bits to determine said data lengths;
 said demodulator converting said data lengths into a received code;
 a code register for storing a stored code;
 a code comparator connected to said demodulator and said code register for comparing said stored code and said received code; and
 an output driver for enabling a function if said stored code is equal to said received code.

9. A remote control system as recited in claim 8 wherein said modulator generates a guard time within each of said segments, said comparator comparing said guard time and said data length, and if said data length is less than said guard time, providing an indication of corrupt data.

10. A remote control system as recited in claim 9 wherein said guard time has a second logic level.

11. A remote control system as recited in claim 9 wherein said start bit having a first logic level.

12. A remote control system as recited in claim 9 wherein said data length having a second logic level.

13. A remote control system as recited in claim 9 further comprising an error detector connected to said demodulator comparing said parity corresponding to said start bit to said parity of said received code, said error detector generating an error signal if said parity corresponding to said start bit is not equal to said parity of said received code.

14. A method for operating a remote control device having a transmitter and a receiver, said receiver having a memory, said transmitter generating a transmission of a code, comprising the steps of:

generating a code, said code having a plurality of bits;

grouping said bits into a plurality of groups;

determining a parity and a numeric value for each of said groups;

transmitting a code having a plurality of segments each corresponding to a respective one of said groups, each of said segments having a start bit corresponding to said parity of said respective group and a data length corresponding to said respective numeric value, said data length being determined by a length of time between successive start bits of successive segments;

receiving said transmission;

converting said transmission into a received code based on said received data length of each of said segments;

comparing said code to a stored code in said memory of said receiver; and enabling said remote control device if said received code matches said stored code.

15. A remote control system as recited in claim 14 further comprising the steps of:

converting said data length into a numeric value having a parity;

comparing said parity corresponding to said received start bit to said parity of said numeric value; and if said parity of said numeric value is not equal to the parity indicated by said start bit, providing an indication of corrupt data.

16. A remote control system as recited in claim 14 wherein each of said segments has a predetermined guard time, said method further comprising the steps of:

comparing said received data length to said predetermined guard time; and if said received data length is less than said predetermined guard time, providing an indication of corrupt data.

* * * * *